(12) United States Patent
McBride

(10) Patent No.: US 7,513,762 B2
(45) Date of Patent: Apr. 7, 2009

(54) MOLDING A TREAD BELT FOR A TWO-PIECE TIRE

(75) Inventor: Michael Liam McBride, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 834 days.

(21) Appl. No.: 10/998,880

(22) Filed: Nov. 29, 2004

(65) Prior Publication Data

US 2006/0113708 A1 Jun. 1, 2006

(51) Int. Cl.
*B29C 35/02* (2006.01)

(52) U.S. Cl. .......................................... 425/43; 425/46

(58) Field of Classification Search ................ 425/28.1, 425/43, 46, 47, 54
See application file for complete search history.

(56) References Cited

U.S. PATENT DOCUMENTS

| 2,381,395 | A | * | 8/1945 | Brown .......................... 425/40 |
| 3,358,330 | A | * | 12/1967 | Pacciarini et al. .............. 425/39 |
| 4,510,113 | A | * | 4/1985 | Takano et al. .................. 425/47 |
| 4,826,416 | A | * | 5/1989 | Majerus et al. ............. 425/115 |
| 5,066,448 | A | * | 11/1991 | Chlebina et al. ............. 264/334 |
| 6,086,811 | A | * | 7/2000 | Fike ......................... 264/271.1 |
| 7,001,163 | B2 | * | 2/2006 | McBride et al. ............... 425/46 |

* cited by examiner

*Primary Examiner*—James Mackey
(74) *Attorney, Agent, or Firm*—Howard M. Cohn

(57) ABSTRACT

A tread belt is molded and cured in a mold having a base plate and an inverted cup-shaped top plate. A plurality of inner segments are disposed in the mold. When the mold is closed outer surfaces of the inner segments form a cylindrical surface which is in contact with an inner surface of the tread belt. A first portion of the inner segments are follower segments, a second portion of the inner segments are leader segments, and means are provided for controlling radial movement of the inner segments. A plurality of outer segments are disposed in the mold. When the mold is closed the inner surfaces of the outer segments form a cylindrical surface which is in contact with an outer surface of the tread belt, and means are provided for controlling movement of the outer segments.

11 Claims, 4 Drawing Sheets

MOLDING A TREAD BELT FOR A TWO-PIECE TIRE

TECHNICAL FIELD OF THE INVENTION

The invention relates to the fabrication of tires, particularly pneumatic tires, more particularly large earthmoving tires, more particularly to molding the tread belt component of a two piece tire such as a large earthmoving tire.

BACKGROUND OF THE INVENTION

A pneumatic tire generally comprises a carcass (or "casing"), a tread, sidewalls and bead regions. The tread belt is generally cylindrical, having an inner diameter, an outer diameter, a height, and an overall thickness. A number of belt components, also generally cylindrical, may be incorporated into the tread package. For passenger car and light truck tires, all these components are molded into a single tire. "Green" uncured tire components are laid up on a build drum which is expanded to form the casing, then the casing is put into a mold where the tread is applied and the tread pattern is molded into the external surface of the tread package.

Earthmoving tires are very expensive, and since the tread typically wears out before the casing (or "carcass") wears out, a separate "tread belt" component is designed to be removable and replaceable. This forms what is known as a "two piece" tire. Often in a two piece tire, the inner surface of the tread belt is molded to have circumferentially-extending grooves which are spaced apart and parallel with one another and which mate with circumferentially-extending ridges on the outer surface of the tire carcass. The grooves and ridges may be appropriately tapered to facilitate the ridges inserting firmly into the grooves. Generally, the expansion of the tire carcass when it is inflated holds the tread belt in place, and the mating grooves and ridges help prevent the tread belt from moving axially with respect to the tire carcass. The large surface area of contact between the tread belt and the coefficient of friction, prevents the tread belt from spinning circumferentially upon the carcass.

Two piece, tread belt pneumatic tires are currently typically very large tires (greater than 119.9 inches outside diameter (OD)) generally designed for use on very large vehicles, generally off-the-road vehicles such as earthmovers and large capacity mining trucks (e.g., 300 short tons or more). The size of these tires is extremely large. For an example, the tire weight can be approximately 8,000 pounds (3,628 kg) to 15,000 pounds (6,803 kg) or more for an unmounted tire. When using a two-piece type tire wherein the tread belt forms the outer structure and the inner structure is formed by a carcass wherein the two parts are separable, the tread belt alone will weigh over 4,000 pounds typically, many times more depending on the size. By way of example, a 57 inch nominal rim diameter two-piece tire having a 45R57 size will have a tread belt assembly having an outside diameter of approximately 12 foot or roughly 144 inches and will weigh approximately a little more than 4,500 pounds. Likewise, a smaller but still very large 51 inch nominal rim diameter tire of a 3300R51 size can yield a 3000 lb. tread belt.

FIG. 1 illustrates a generic two piece pneumatic tire 100 having a carcass comprising two sidewalls and a crown extending between radially outer ends of the sidewalls. Beads are disposed in a bead region at the radially inner ends of the sidewalls. A tread belt is disposed around the crown. The tire has a centerline CL which will be coincident with its axis of rotation. The tire has an equatorial plane EP and is generally symmetrical about the EP. The tire has an inner diameter (d1) which is essentially the diameter of a rim (not shown) to which the tire will be mounted. The tire has an outer diameter (d2) which is the outer diameter of the tread belt when properly mounted on the tire carcass. The tire has a width ($W_1$), from sidewall-to-sidewall (or, across the tread belt). At the left hand side of FIG. 1, the tread belt is shown spaced apart from the crown (exploded view) for illustrative clarity. Here can be seen the ridges and grooves on the inner surface of the tire belt, and the corresponding (mating) grooves and ridges on the outer surface of the crown portion of the tire. This is all well known.

Presently, tread belts are laid up and cured in individual cure stations. These stations are costly to build, maintain, and operate. These stations can also produce only one specific type of product and generate only a quantity of one product at a time. In the molding concept that will be hereunto declared, the functionality of which, in combination with the conventional means of a pot-heater, replaces that of these costly cure stations. The current process calls for great energy utilization within the cure station to procure the belts in addition to great energy utilization in the pot heater to procure the casings. Utilization of the pot heater allows for greater flexibility of product cure variation and reduces the amount of energy needed to cure both products needed to produce the two-piece tire.

SUMMARY OF THE INVENTION

It is an aspect of the invention to provide an improved technique for forming a removable/replaceable tread belt for two piece (tread belt type) tires, such as large pneumatic earthmoving tires.

According to the invention, a mold apparatus for molding a tread belt component of a two-piece tire, comprises: a generally planar, generally circular base plate having an inner surface and an outer surface; and a cup-shaped top plate having a generally planar base portion and a generally cylindrical sidewall portion extending downward from a periphery of the base portion, the top plate having an inner surface and an outer surface. The mold has a centerline (CL), the base plate is concentric with the centerline, and the top plate is concentric with the centerline. A chamber is formed under the top plate when mold is in a closed position (FIG. 2B). Means are provided for supporting a green tread belt within the mold, concentric with the centerline (CL) of the mold.

A plurality (n1) of inner segments are disposed in the mold, each inner segment comprising a generally elongate element comprising a top surface, a bottom surface, an inner surface and an outer surface, and two opposite side edges.

When the mold is in a closed position (FIG. 2B, FIG. 3D) the outer surfaces of the inner segments form a substantially continuous, cylindrical surface which is in contact with an inner surface of the tread belt.

According to a feature of the invention, the outer surface of the inner segments is patterned with ridges and grooves which will mold corresponding grooves and ridges into an inner surface of the tread belt.

A first portion of the inner segments are follower segments, a second portion of the inner segments are leader segments. Means are provided for controlling radial movement of the inner segments.

In an embodiment of the invention, the means for controlling radial movement of the inner segments comprises a driving shaft having a nominal diameter a strike plate at a top end of the driving shaft; a catch plate disposed below the top end of the driving shaft and having a diameter greater than the nominal diameter of the driving shaft; first resilient means disposed about the driving shaft below the catch plate and having a first spring constant (k1); a collar disposed about the driving shaft, below the first coil spring having a diameter greater than the nominal diameter of the drive shaft and being free to move axially on the driving shaft; second resilient means disposed about the driving shaft below the collar and having a second spring constant (k2) which is greater than the first spring constant (k1); a first set of linkage beams extending from between the strike plate and the catch plate of the driving shaft to the follower segments, and forming an angle theta (θ) with respect to horizontal; and a second set of linkage beams extending from the collar of the driving shaft to the leader segments and forming an angle omega (Ω) with respect to horizontal.

According to a feature of the invention, the opposite side edges of the follower segments are tapered slightly outwardly with respect to a radial direction from the centerline, and the opposite side edges of the leader segments are tapered slightly inwardly with respect to the radial direction from the centerline.

A plurality (n2) of outer segments are disposed in the mold, each outer segment comprising a generally elongate element comprising a top surface, a bottom surface, an inner surface, an outer surface, and two opposite side edges. When the mold is in its closed position (FIG. 2B) the inner surfaces of the outer segments form a substantially continuous, cylindrical surface in intimate contact with an outer surface of the tread belt. Means are provided for controlling movement of the outer segments radially inward and outward, with respect to the centerline (CL). These means comprise a tapered inner surface of the sidewall portion of the top plate; and a tapered outer surface of the outer segments. T-shaped slots are formed in the outer surface of the outer segments, and corresponding features extending from an inner surface of the sidewall portion. A number of lugs may be disposed on the inner surface of selected ones of the outer segments for forming a tread pattern in the tread belt.

According to the invention, a method is provided for molding a tread belt for a two piece tire, comprising the steps of: with a mold in an open position, loading a green tread belt into the mold; then closing the mold; then disposing the closed mold in a pot heater; then curing the green tread belt; and then opening the mold and removing the cured tread belt.

According to a feature of the invention, another mold may be disposed in the pot heater for curing another green tread belt for the tire; and a carcass for the tire may be disposed in the pot heater for curing.

The invention allows for curing of tread belts in a pot-heater environment that currently exists without having to create or develop cure stations. This has potential to be more practical and cost effective than investment into additional cure stations. In fact, the belt (or two belts, in keeping the two belts sold for every casing philosophy. One can stack many molds into a pot-heater.) may very well may be able to be cured at the same time as the tire to which the product will eventually be mated. This provides the ability to cure two belts and one casing in the same time and using the same energy as what it takes to cure just one casing now.

Other objects, features and advantages of the invention will become apparent in light of the following description thereof.

BRIEF DESCRIPTION OF THE DRAWINGS

Reference will be made in detail to preferred embodiments of the invention, examples of which may be illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the figures may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

The structure, operation, and advantages of the present preferred embodiment of the invention will become further apparent upon consideration of the following description taken in conjunction with the accompanying figures (FIGs).

Figure 1:
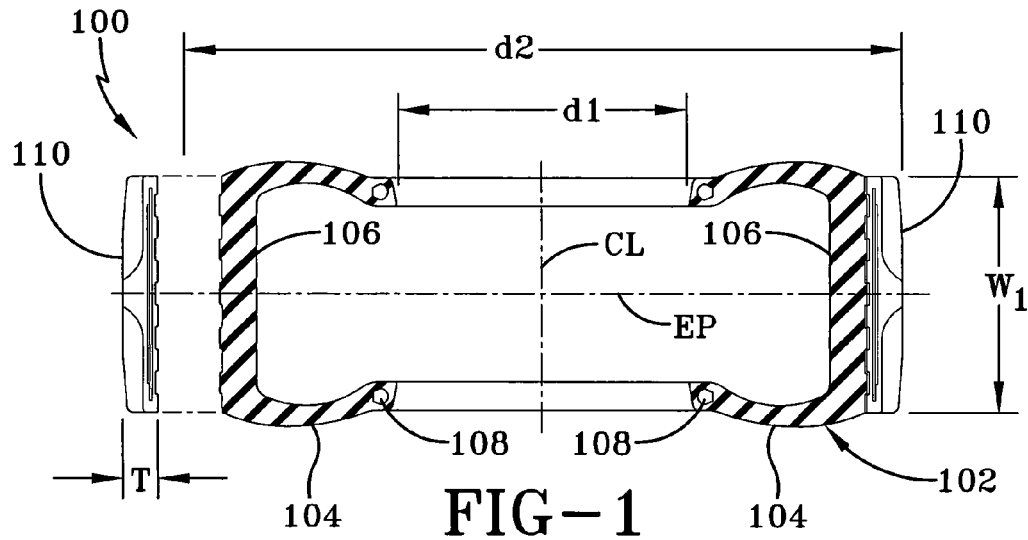

FIG. 1 is a cross-sectional, partially exploded view of a two piece tire, according to the prior art.

Figure 2A:
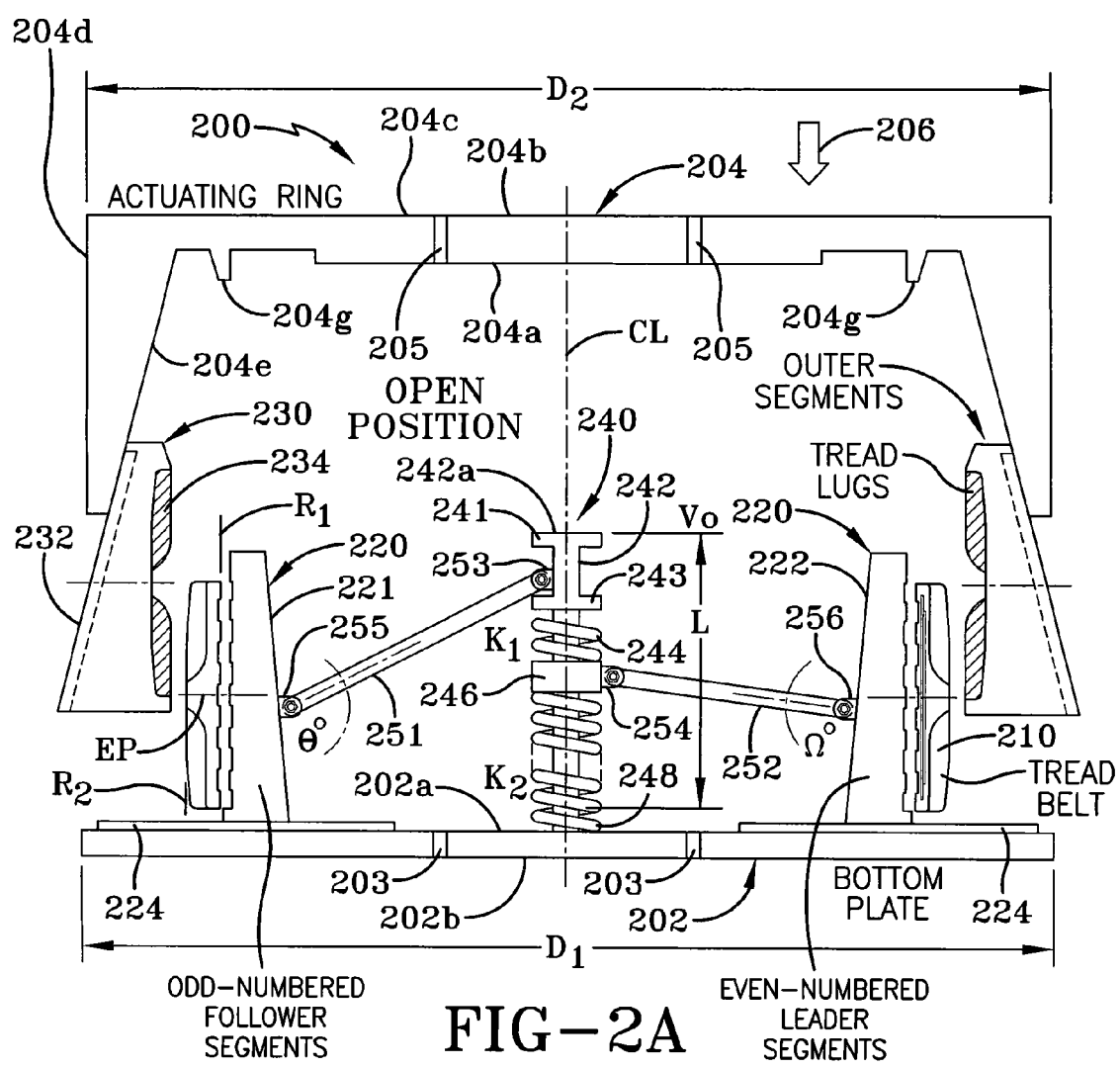

FIG. 2A is a near-sighted, cross-sectional view of a mold for molding tread belt for earthmoving tire, in an OPEN position, according to the invention.

Figure 2B:
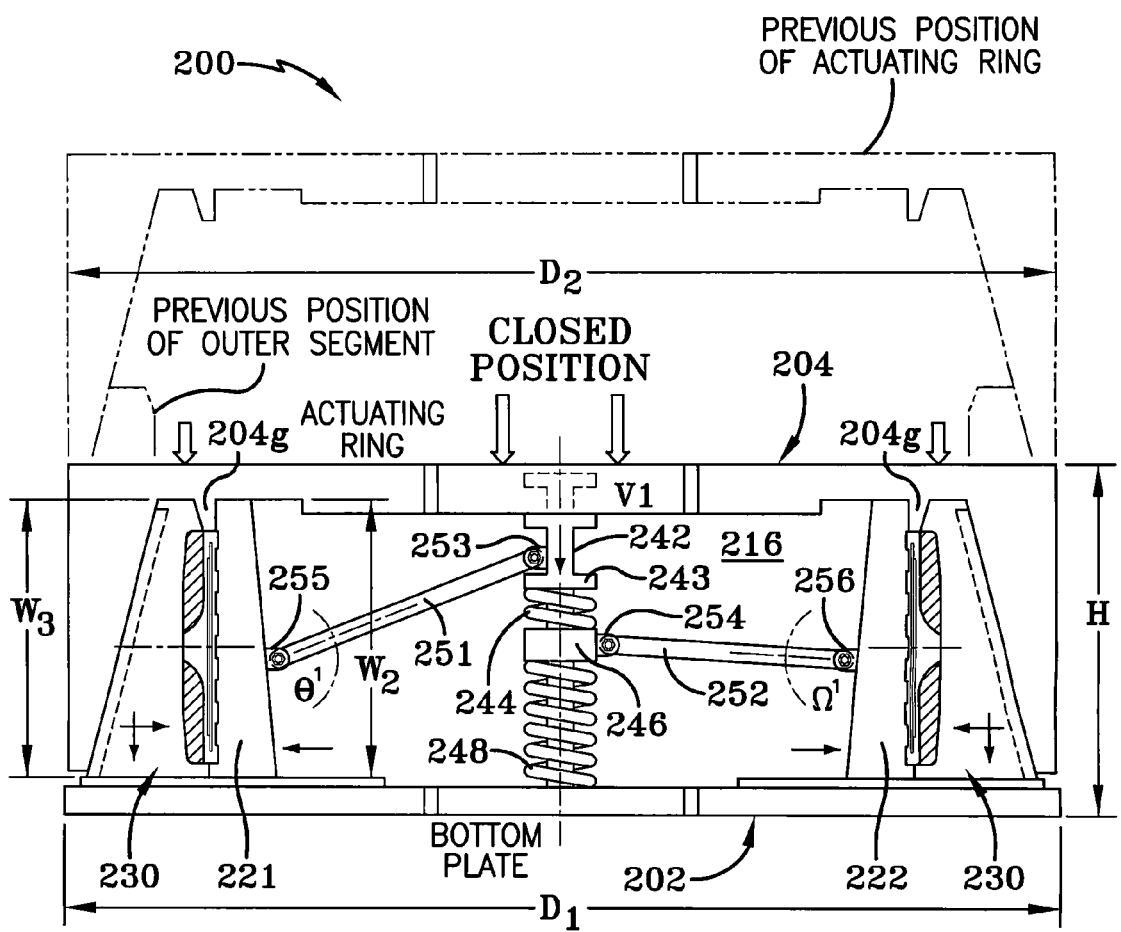

FIG. 2B is a near-sighted, cross-sectional view of a mold for molding tread belt for earthmoving tire, in a CLOSED position, according to the invention.

Figure 3A:
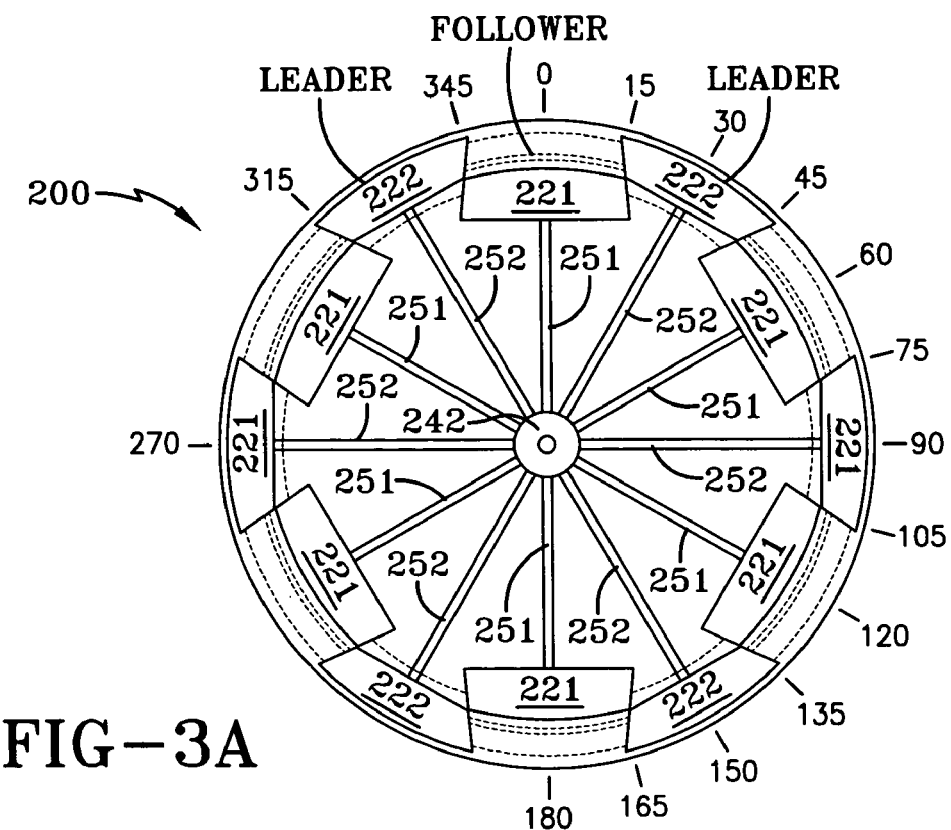

FIGS. 3A,B,C,D are top views illustrate the operation of the mold of FIGS. 2A, 2B, according to the invention.

DETAILED DESCRIPTION OF THE INVENTION

FIGS. 2A and 2B illustrate a mold 200 for molding a tread belt 210 (compare 110) for a two piece tire, such as a large earthmoving tire. In FIG. 2A, the mold 200 is shown in an "open" (OPEN) position. In FIG. 2B, the mold 200 is shown in a "closed" (CLOSED) position. FIGS. 3A,B,C,D illustrate in further detail the operation of the mold 200.

The mold (molding apparatus) 200 generally comprises a base, or bottom plate 202 and a top plate, or actuating ring 204.

The base plate 202 is generally planar, and may be generally circular, having a diameter (D1). The base plate 202 is preferably disposed horizontally, as illustrated in FIGS. 2A and 2B. The base plate 202 has an inner surface 202a and an outer surface 202b.

The top plate 204 is generally in the form of an inverted cup (cup-shaped) having a generally planar base portion 204c disposed horizontally (i.e., generally parallel to the base plate 102) and a generally cylindrical sidewall portion 204d extending downward from a periphery (circumference) of the base portion 204a. (The sidewall portion 204d is tapered, as described hereinbelow.) The top plate 204 has an inner surface 204a and an outer surface 204b. The top plate 204 has a diameter (D2) which is approximately equal to the diameter (D1) of the base plate 202. The sidewall portion 204d extends vertically downward (vertical in the figures) a distance H (height). The base portion 204c of the top plate 204 may also be generally circular, parallel to the generally circular base plate, both of which are concentric with a centerline (CL) of the mold 200.

As best viewed in FIG. 2B, when the mold is in its closed position (CLOSED POSITION), a chamber 216 is formed under the top plate 204, between the inner surface 204a of the top plate 204 and the inner surface 202a of the bottom plate 202. In the process of curing the tread belt 210 (described in greater detail hereinbelow), the entire mold assembly 200 is disposed in a "pot heater" which provides a high temperature ambient environment with steam, comparable to that of a large-scale "pressure cooker". Although the mold is not completely airtight in the CLOSED POSITION, a plurality of steam inlets (openings) 203 are provided through the bottom plate 202, and a plurality of steam inlets (openings) 205 are provided through the top plate 204 to facilitate steam entering the chamber 216 of the mold 200. An external mechanism is provided for urging the top plate 204 down onto the bottom plate 202, as indicated by the arrow 206, thereby "closing" the mold 200.

The overall purpose of the mold 200 is to mold a tread pattern into and cure a tread belt 210 (compare 110) for a pneumatic tire. As will become evident, a plurality of molds are conveniently disposed in a pot heater (not shown) for simultaneously molding and curing a plurality of tread belts.

The tread belt 210 (or 110 is more direct to the immediate product & dimensions) is essentially a continuous cylindrical belt having a width dimension W1 (vertical in FIGS. 2A, 2B) and a thickness dimension T (horizontal in FIGS. 2A, 2B). The tread belt 210 comprises layers of elastomer, as well as belt plies. In its raw (green) state, the tread belt 210 is essentially a cylinder of green rubber, having a generally planar inner surface and a generally planar outer surface, rectangular in cross section, and is disposed in the mold 200 concentric with the centerline (CL) of the mold.

A plurality n1 of inner segments 220 are disposed in the mold 200. The inner segments 220 each have a top (towards the top plate 204) surface, a bottom (towards the bottom plate 202) surface, an inner (towards the centerline CL) surface and an outer (towards the tread belt 210) surface. (It is no particular significance that the inner surfaces of the inner segments are illustrated as being tapered.) The inner segments 220 also have two opposite side edges, better viewed in FIGS. 3A-3D. The inner segments 220 are generally elongate elements having a height W2 which is slightly greater than the width W1 of the tread belt. Each of the 12 inner segments extends approximately 30 degrees (360/n1) around the inner circumference of the tread belt. As described in greater detail hereinbelow, the inner segments 220 move radially outward and inward (with respect to the centerline CL). When all of the inner segments 220 are moved outward, their outer surfaces form, in aggregate, a substantially continuous, cylindrical surface (mandrel) which is in intimate contact with the inner surface of the tread belt 210, for holding and molding the inside surface of the tread belt 210. In FIG. 2A, the inner segments 220 are shown retracted slightly, such as a radial distance R1 from the inner surface of the tread belt 210.

There are preferably an even number, such as twelve (12) inner segments 220. For example, six (6) odd-numbered segments 221 and six (6) even-numbered segments 222. The even-numbered segments 222, shown to the right of the drawing, are referred to as "leader" segments, and the odd-numbered segments 221, shown to the left of the drawing, are referred to as "follower" segments, for reasons which will become apparent from the description set forth hereinbelow. As best viewed in FIGS. 3A-3D, the odd-numbered follower segments 221 alternate with the even-numbered leader segments 222. In FIGS. 3A-3D, the side edges of the segments 220 can be seen.

The tread belt 210 is initially held in place (supported) within the mold 200 by an annular (segment) lip extending radially outwardly from the outer surface of each of the inner segments 220 (221, 222), forming a "shelf" supporting the tread belt 210 at its bottom edge. This could also be achieved by a "bolt-in" ring in place of a lip or "shelf" extension from the inner segments.

When the mold is closed (CLOSED POSITION), as illustrated in FIG. 2B, the inner segments 220 all expand (move radially outward) into intimate contact with the tread belt 210. The outer surface of the segments 220 is patterned with ridges and grooves which will mold corresponding grooves and ridges into the inner surface of the tread belt 210. The mechanism for controlling movement of the inner segments 220 is described hereinbelow. To facilitate the radial movement of the inner segments 220, a sliding surface 224 is disposed on the inner surface 202a of the bottom plate 202. The sliding surface 224 may simply comprise aluminum-bronze or some other comparable material. The inner segments 220 are all disposed (supported) on the sliding surface 224. Since the inner segments 220 all move radially outward (and inward), slots (or the like) can be incorporated in to inner surface 202a of the bottom plate 202, and corresponding features formed on the bottom surfaces of the inner segments 220 to limit anything other than radial movement of the inner segments 220.

A plurality n2 of outer (outside) segments 230 are disposed in the mold 200. The outer segments 230 each have a top (towards the top plate 204) surface, a bottom (towards the bottom plate 202) surface, an inner (towards the centerline CL) surface and an outer (away from the centerline CL) surface. The outer segments 230 also have two opposite side edges. The number n2 of outer segments 230 is independent of the number n1 of inner segments 220. For purposes of this discussion, there are twelve (12) outer segments 230. The outer segments 230 are generally elongate elements having a height W3 which is slightly greater than the width W1 of the tread belt 210. Each of the twelve outer segments extends approximately 30 degrees around the outer circumference of the tread belt. As described in greater detail hereinbelow, the outer segments 230 move radially inward and outward (with respect to the centerline CL). When all of the outer segments 230 are moved inward, their inner surfaces form a substantially continuous, cylindrical surface (mandrel) which is in intimate contact with the outer surface of the tread belt 210, for molding the outer surface of the tread belt 210. In FIG. 2A, the outer segments 230 are shown retracted slightly, such as a radial distance R2 from the outer surface of the tread belt 210.

The inner surface 204e of the sidewall portion 204d is not vertical, but rather is tapered, as shown, for example at an angle of 15-30 degrees, such as 20-25 degrees from vertical, so that the inside diameter of the sidewall portion 204d is smaller where the sidewall portion 204d joins the base portion 204c and greatest where the sidewall portion 204d is distal from the base portion 204c. The outer surface of the outer segments 230 is similarly tapered, as shown. These two tapered surfaces cooperate with one another. The purpose of the tapered surfaces is to impart inward radial movement of the outer segments 230, when the actuating ring (top plate) is urged downwards, as described hereinbelow, and to control the radial positioning of the outer segments 230. (The tapered surfaces constitute a means for controlling movement of the outer segments 230.)

The outer segments 230 are suitably held in place on the inner surface 204e of the sidewall portion 204d of the top plate 204 by T-shaped slots 232 formed in the outer surface of the outer segments 230, and corresponding featured such as T-shaped lugs (or a rail, not shown) extending from (or on) the inner surface 204e of the sidewall portion 204d. In this manner the outer segments 230 are free to slide up and down. In FIG. 2A, the mold is in the OPEN POSITION and the outer segments are shown "hanging" from the bottom end of the sidewall of the top plate. (The T-slot 232 does not extend completely to the top of the outer segment 230.) In FIG. 2B, the mold is in the CLOSED POSITION, and the outer segments are shown disposed higher up within the sidewall portion. In the CLOSED POSITION, the outer segments 230 will rest upon the aforementioned sliding surface 224 (along with the inner segments 220).

As shown in FIGS. 2A and 2B, a number n3 of lugs 234 are disposed on the inner surface of each outer segment 230. In the cross-sectional view, only two lugs are visible, but there may for example be as many as six lugs—3 rows of 2 lugs. This is a design choice, depending on the desired tread pattern and the number of outer segments available.

Typically, in the CLOSED POSITION, the inner surfaces of the outer segments 230 for a continuous cylindrical surface. When the outer segments 230 are moved radially inward they impress the tread pattern upon the outer surface of the tread belt 210.

A Mechanism for Controlling Movement of the Inner Segments 220

A mechanism 240 is provided for causing and controlling the aforementioned radial outward (and subsequent radial inward) movement of the inner segments 220 (221, 222). The mechanism 240 generally comprises the following components:

a driving shaft 242;
a catch plate 243 disposed below the top of the driving shaft 242;
a first coil spring 244 disposed about the driving shaft 242 below the catch plate 243;
a collar 246 disposed about the driving shaft 242, below the first coil spring 244;
a second coil spring 248 disposed about the driving shaft 242 below the collar 246;
a first set of linkage beams 251 extending from the driving shaft 242 to the odd-numbered follower segments 221; and
a second set of linkage beams 252 extending from the driving shaft 242 to the even-numbered leader segments 222.

The driving shaft 242 is an elongate member having a length L, a top end 242a and a bottom end 242b, and is disposed centrally in the mold 200. The driving shaft 242 has a nominal diameter. A strike plate 241 is disposed at the top end 242a of the driving shaft 242, and has a greater diameter than the driving shaft 242. The strike plate 241 can be a separate piece fixed to the top of the driving shaft, or it may simply be a region of increased diameter (like the head of a nail). The top end 242a of the driving shaft 242 is disposed at a height V0 above the inner surface 202a of the bottom plate 202 with the mold 200 in its OPEN position (FIG. 2A).

The catch plate 243 is disposed below the top 242a of the driving shaft 242 and has a diameter greater than that of the driving shaft 242. The catch plate 243 can be a separate piece fixed to the driving shaft, or simply a region of increased diameter (e.g., a flange).

The first coil spring 244 is disposed about the driving shaft 242 below the catch plate 243 and, as will be seen, is acted upon by the catch plate 243 when the driving shaft 242 is moved downwards. (There is a small gap between the top of the spring 244 and the bottom of the catch plate 243.) The first coil spring 244 has a spring constant (k1) which is generally lower than a spring constant (k2) of the second coil spring 248.

The collar 246 is ring disposed about the driving shaft 242 below the first coil spring 244 and, as will be seen, is acted upon by the first coil spring 244 when the driving shaft 242 is moved downwards. The collar 246 has a greater diameter than the diameter of the driving shaft 242 and is not fixed to the driving shaft but rather is free to "float" (move axially) on the driving shaft.

The second coil spring 248 is disposed about the driving shaft 242 below the collar 246 and, as will be seen, is acted upon by the collar 246 when the driving shaft 242 is moved downwards. The second coil spring 248 has a spring constant (k2) which is generally higher than the spring constant (k1) of the first coil spring 244. The second coil spring 248 rests upon the inner surface 202a of the bottom plate 202. It is within the scope of the invention that one or both of the coil springs 244, 248 can be replaced by other resilient means, such as but not limited to hydraulic pistons.

The driving shaft 242 extends through the first coil spring 244, through the floating collar 246 and through the second coil spring 248. It may also extend through a hole in the bottom plate 202 to keep the driving shaft centered within the mold. Or, a spindle (not shown) may extend upwardly from the bottom plate into a central hole in the driving shaft to keep the driving shaft centered within the mold.

A first set of linkage beams 251 extend from lugs (linkage nodes) 253 disposed on the driving shaft 242 to lugs 255 on the inner surface of the odd-numbered, inner "follower" segments 221. The lugs 253 are between the strike plate 241 and the catch plate 243. The linkage beam 251 is elongate, having a first inner end pivotally connected to the lug 253 and a second, opposite, outer end pivotally connected to the lug 255. (The numbers 253 and 255 may also be used to refer to the corresponding ends of the linkage beam attached to the lugs.) The inner end 253 is disposed higher in the mold than the outer end 255. In FIG. 2A, in the OPEN position, the linkage beam 251 forms an angle $\theta_0$ with respect to horizontal. In FIG. 2B, in the CLOSED position, the linkage beam 251 forms an angle $\theta_1$ with respect to horizontal (and the inner end 253 is still higher than the outer end 255). The angle $\theta_0$ is approximately but not limited to 25-35 degrees. Any angle combination can exist. When the driving shaft 242 is moved downwards, the angle theta $\theta$ decreases and the outer end 255 of the linkage beam 251 moves radially outward, thereby urging the odd-numbered, inner "follower" segments 221 radially outwards.

A second set of linkage beams 252 extend from lugs 254 disposed on the floating collar 246 to lugs 256 on the inner surface of the even-numbered, inner "leader" segments 222. The linkage beam 252 is elongate, having a first inner end pivotally connected to the lug 254 and a second, opposite, outer end pivotally connected to the lug 256. (The numbers 254 and 256 may also be used to refer to the corresponding ends of the linkage beam attached to the lugs.) The inner end 254 is disposed higher in the mold than the outer end 256. In FIG. 2A, in the OPEN position, the linkage beam 252 forms an angle $\Omega_0$ with respect to horizontal. In FIG. 2B, in the CLOSED position, the linkage beam 252 forms an angle $\Omega_1$ with respect to horizontal (and the inner end 254 is still higher than the outer end 256). The angle $\Omega_0$ is approximately but not limited to 5-20 degrees. When the driving shaft 242 is moved downwards, the angle omega $\Omega$ decreases and the outer end 256 of the linkage beam 252 moves radially outward, thereby urging the even-numbered, inner "leader" segments 222 radially outwards.

Opening and Closing the Mold 200

The mold 200 and its constituent elements have been described. With the mold 200 in an open position (labeled OPEN POSITION in FIG. 2A), the "green" tread belt 210 is loaded into the mold, resting on the lips extending radially outwardly from the outer surface of the inner segments 220, as described hereinabove. The top half of the mold is then lowered onto the bottom plate and working mechanism of the mold. This mold is then lifted as one piece, possibly along with a stack of other molds, and hoisted into the pot heater. Then the mold is pinched tight typically by raising the bottom plate 202 upwards by means of an internal pot-heater hydraulic ram pressure (rather than pushing the top plate 204 downwards), thereby bringing the top and bottom plates together until the sidewall 204d of the top plate 204 contacts the bottom plate 202. (In theory, the top plate 104 can be moved downward onto a stationary bottom plate 202, and the description is geared to this possibility since it may be easier to envision.) This is shown in FIG. 2B, labeled CLOSED POSITION. As the mold is closing, a number of things are happening, as follows.

When the mold is closed, the outer segments 230 move downwards and inwards, as indicated by the intersecting down and inward arrows appearing on the outer segments 230 in FIG. 2B. As mentioned above, the inner surface 204e of the sidewall portion 204d is tapered and the outer surfaces of the outer segments 230 are similarly tapered to that these two tapered surfaces cooperate with one an other to impart inward radial (as well as axial) movement of the outer segments 230, when the actuating ring (top plate) is urged downwards, as well as to control the radial positioning of the outer segments 230. (The tapered surfaces together constitute a "Mechanism For Controlling Movement Of The Outer Segments 230".) In the CLOSED POSITION, the outer segments 230 are radially inward and engage the outer surface of the tread belt 210 so that the tread lugs 234 form a tread pattern in the outer surface of the tread belt 210.

When the mold is being closed, a sequence of events happens with respect to the inner segments 220.

First, the inner surface 204a of the top plate 204 contacts the strike plate 241 which is disposed at the top end 242a of the driving shaft 242 and the driving shaft 242 begins to move downward. This moves the inner ends 253 of the linkage beams 251 downward (see arrow adjacent lug 253), which will "flatten out" (reduce) the angle theta $\theta$ of the linkage beams 251, and will urge the inner, odd-numbered follower segments 221 radially outward (see arrow adjacent bottom of inner segment 221). (The height of the outer ends 255 of the linkage beams 251 does not vary. It is the height of the lug 255 to which is it attached. The lug 255 is fixed to the inner surface of the inner segment 221 which moves only radially.)

Next, the driving shaft 242 continues to move downward until the catch plate 243 contacts the first spring 244. (There is a small gap between the top of the spring 244 and the bottom of the catch plate 243.) As this is happening, the linkage beams 251 continue to flatten out and the inner, odd-numbered follower segments 221 continue to be moved radially outward.

Next, the first spring 244 which is weaker (lower spring constant) than the second spring 248 compresses, until it bottoms out. As this is happening, the linkage beams 251 continue to flatten out and the inner, odd-numbered follower segments 221 continue to be moved radially outward.

As this is happening (i.e., the first spring 244 collapsing), the floating collar 246 begins to move downward, resisted only by the larger spring 248, which begins to compress. When the floating collar 246 moves downward, this moves the inner ends 254 of the linkage beams 252 downward (see arrow adjacent lug 254), which will "flatten out" (reduce) the angle omega $\Omega$ of the linkage beams 252, and will urge the inner, even-numbered leader segments 222 radially outward (see arrow adjacent bottom of inner segment 222). (The height of the outer ends 256 of the linkage beams 252 does not vary. It is the height of the lug 256 to which is it attached. The lug 256 is fixed to the inner surface of the inner segment 222 which moves only radially.)

As the bottom spring 248 compresses, this allows the floating collar 246 to continue to move downward, the result of which is that (i) the linkage beams 251 continue to flatten out and the inner, odd-numbered follower segments 221 continue to be moved radially outward, and (ii) the linkage beams 252 continue to flatten out and the inner, even-numbered leader segments 222 continue to be moved radially outward. (Since the angle theta $\theta$ and angle omega $\Omega$ are different than one another, as the driving shaft 242 and the floating collar 246 move downward, different amounts of radial motion will be imparted to the follower segments 221 than to the leader segments 222. This is all straightforward, and one having ordinary skill in the art to which the invention most nearly pertains will readily understand what angles will work with each other, and how, based on his given application and the description set forth herein.)

Eventually, all of the inner segments 220 will be fully expanded so that in the CLOSED POSITION, the inner segments 220 engage the inner surface of the tread belt 210 so that (i) the tread belt is secured against the force coming in on it from the outer segments and (ii) a desired pattern (e.g., grooves and ridges) is formed on the inner surface of the tread belt 210. In other words, the tread belt 210 is compressed between the inner segments 220 and the outer segments 230.

This all continues until either (i) the engagement of the inner and outer segments upon the tread belt disposed therebetween prevents further movement of the inner and outer segments, or (ii) the sidewall 204d of the top plate comes to rest against the inner surface 202a of the bottom plate 202. (Preferably, dimensions and clearances are designed so that (ii) happens before (i).) During all this movement described hereinabove, the tread belt 210 does not move per se, it just gets radially squeezed (or compressed).

With the mold in its CLOSED POSITION, the linkage beam 251 forms an angle $\theta_1$ with respect to horizontal. The inner end 253 is still disposed higher in the mold than the outer end 255. The angle $\theta_1$ is substantially non-zero, such as but not limited to 15 degrees. The linkage beam 252 forms an angle $\Omega_1$ with respect to horizontal. The inner end 254 is still disposed higher in the mold than the outer end 256. The angle $\Omega_1$ is nearly zero, such as but not limited to 5-10 degrees.

With the mold in its CLOSED POSITION, the top end 242a of the driving shaft 242 is disposed at a height V1 above the inner surface 202a of the bottom plate 202. The difference between V0 and V1 (i.e., V0−V1 =S) equals the extent S of the vertical movement of the driving shaft 242.

With the mold in its CLOSED POSITION (FIG. 2G), annular raised feature 204g (best viewed in FIG. 2A) which extends downward from the inner surface 204a of the top plate 204 urges downward on top surfaces of the tread belt 110. Notice also that the top ends of the inner segments 220 and the outer segments 230 extend axially higher than the tread belt 210. In these top end regions, the inner and outer segments are formed to have a gap between them when the mold is in its CLOSED POSITION (FIG. 2G) and the annular raised feature 204g becomes disposed in this gap, preventing further closure of the outer segments 230 onto the inner segments 220 (i.e., limits how much the tread belt 210 becomes radially compressed).

With the mold in its CLOSED POSITION, the entire mold (200) is disposed in a pot heater to cure the green tread belt 210, as discussed in further detail hereinbelow. A corresponding tire carcass (not shown) can also be disposed in the same pot heater for curing, along with one or more additional tread belts for the given carcass.

After curing the tread belt, the mold is removed from the pot heater and the sequence is reversed (the top and bottom plates are moved apart), the segments 220 and 230 retract, and the cured tread belt 210 can be removed.

From the above, it can be observed that the follower segments 221 begin moving before the leader segments 222. This is described in greater detail below, with respect to FIGS. 3A-3D.

Operation of the Mold 200 and the Mechanism 240

FIGS. 3A-3D illustrate the operation of the mold 200, from which it can more readily be seen that the mechanism 240 operates as a kinematic timing device for controlling the timed, sequential movement of the inner segments 220 (221 and 222) in response to downward movement of the top plate 204 upon initial mold closure outside of the pot heater (as mentioned before, typically it is the bottom plate 202 that moves up during final pinch-off, rather than it being the top plate 104 which moves down) and consequent downward movement of the driving shaft 242. The sequence starts off (FIG. 3A) with the mold 200 in its OPEN POSITION (FIG. 2A). The sequence finishes (FIG. 3D) with the mold 200 in its CLOSED POSITION (FIG. 2B). The sequence can then be reversed, starting with FIG. 3D and finishing with FIG. 3A at the end of the process, to remove the tread belt 210 (not shown).

In these figures, the outermost circle (solid line) represents the substantially cylindrical surface formed by the outer surfaces of the inner segments 230 when they are fully expanded, in the CLOSED POSITION (FIG. 2B). (Or, the outermost circle represents the inner surface of the tread belt 210.) The other, concentric dashed circles are included as an aid to the reader, to judge distances. Various angles around the circle are also set forth, as an aid to the reader.

Each figure shows six follower segments 221 alternating with six leader segments 222. Each segment 221 and 222 spans approximately 30 circumferential degrees. For example, the follower segment 221 at the top of the figures spans 30 degrees between 345° and 15°. The leader segments 222 to the left and right of that follower segment span 30 degrees between 315° and 345° and 15° and 45°, respectively.

It can be seen that the follower segments 221 have a slightly different profile than the leader segments 222. The opposite side edges of the follower segments 221 are tapered slightly outwardly (with respect to radial), and the side edges of the leader segments 222 are tapered slightly inwardly, so that they can "merge" (move radially outwardly) to their most radial outward position without crashing into each other.

Each figure shows six linkage beams 251 connecting to the six follower segments 221, and six linkage beams 252 connecting to the six leader segments 222. In some of the figures, one or both of the linkage beams 251, 252 are shaded. The shading indicates vertical movement of the linkage.

In FIG. 3A, the inner segments 220 are shown in their open position. The follower segments 221 are more inward than the leader segments 220. Neither of the linkage beams 251, 252 are shaded in this figure.

Figure 3B:
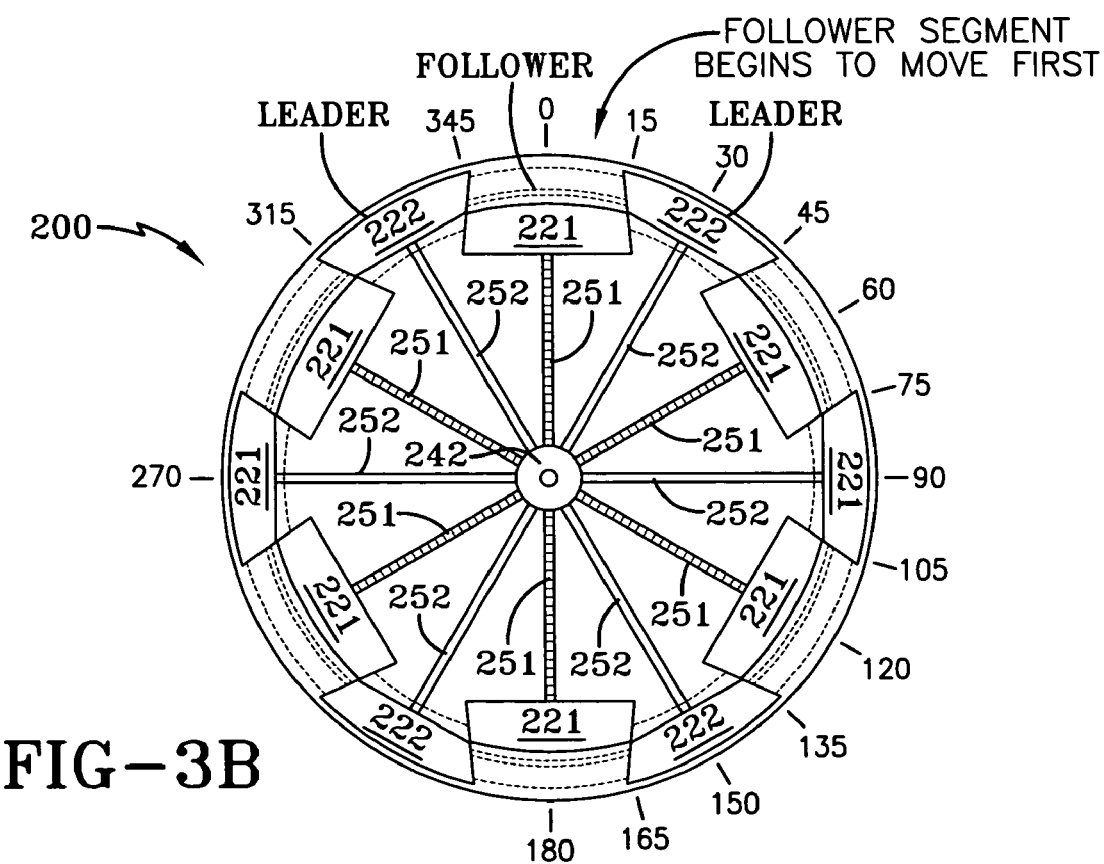

In FIG. 3B, it can be seen that the follower segment 221 begins to move first when the top plate 204 engages the driving shaft 242, as described above. The leader segments 222 have not yet moved. Note in this figure that only the linkage beams 251 to the follower segments 221 are shaded.

Figure 3C:
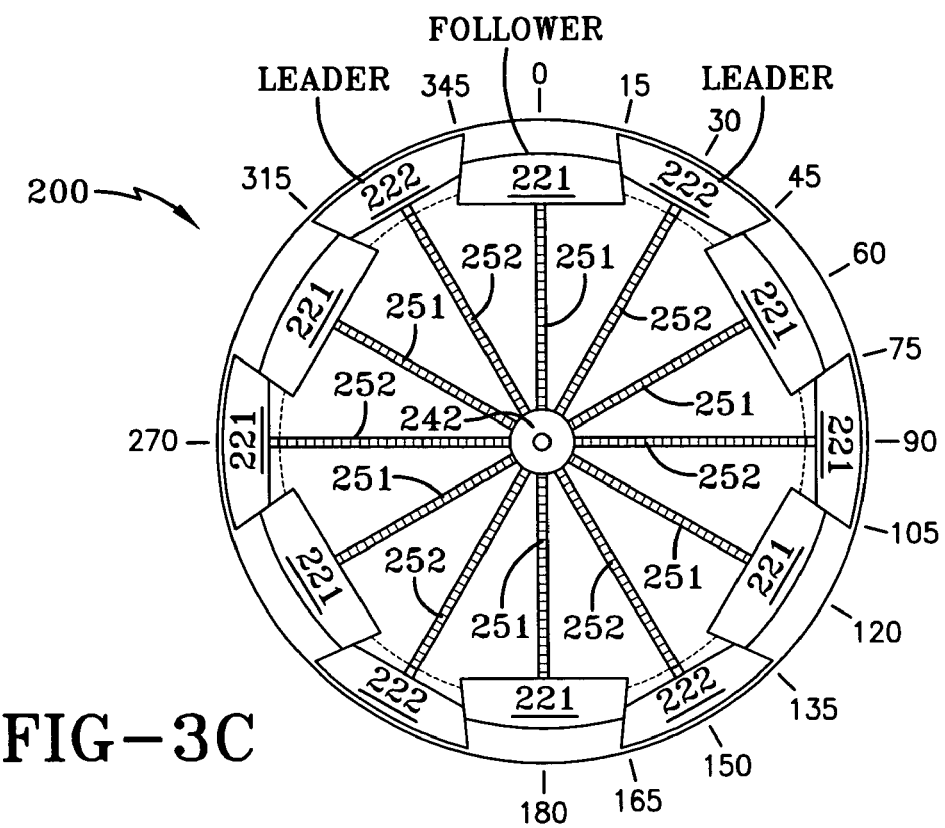

FIG. 3C illustrates that the leader segments 222 begin to move as the top plate 204 pushes the driving shaft 242 further down and the floating collar 246 engages the lower spring 248. After the floating collar 246 engages the lower spring 248, both sets of inner segments 221 and 222 are moving (note that all of the linkage beams 252, 252 are shaded in this figure). It should be noted that although the leader segments 222 are the second to start moving, they will be the first to arrive at their final (radial outward) position.

Figure 3D:
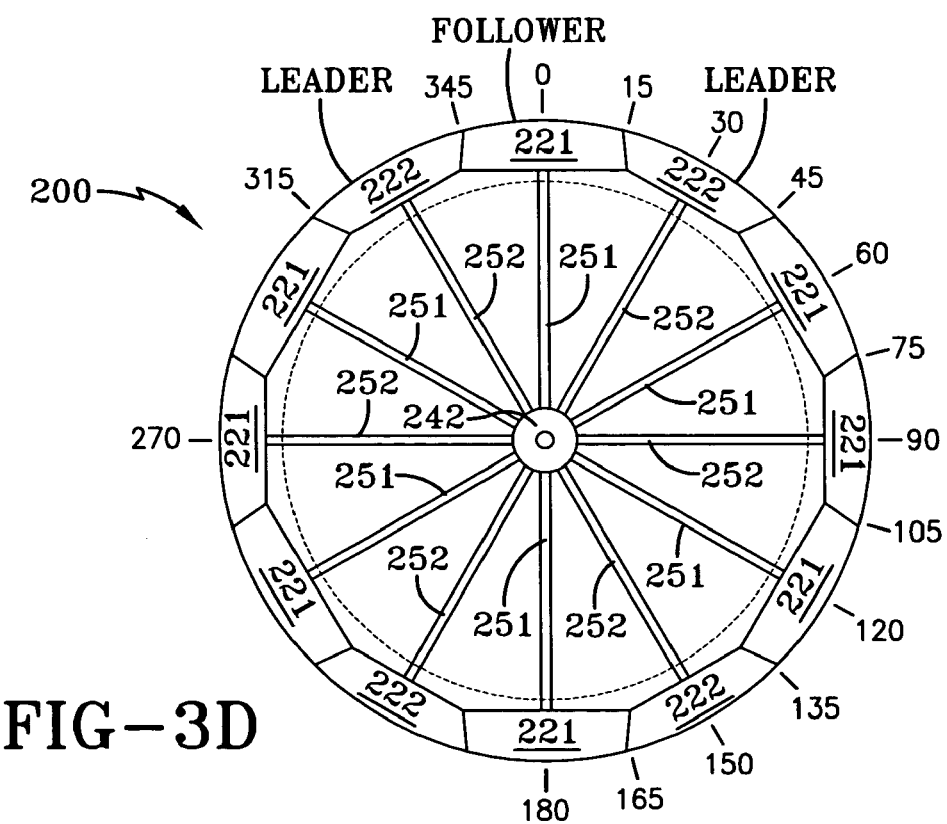

In FIG. 3D, the segments 320 (321, 322) are shown in the CLOSED POSITION (FIG. 2B). In the CLOSED POSITION, the outer surfaces of the inner segments 320 cooperate to form a substantially continuous, substantially cylindrical surface (outer, solid line circle, FIG. 3A) for molding the inner surface of the tread belt (210). Although not shown, with the mold in its CLOSED POSITION, the inner surfaces of the outer segments (230) cooperate to form a substantially continuous substantially cylindrical surface for molding the outer surface of the tread belt (210).

With the tread belt 210 loaded, the inner segments 220 radially expanded (pressing radially outwardly on the inner surface of the tread belt 210), the outer segments 230 radially contracted (pressing radially inwardly on the outer surface of the tread belt 210), the mold 200 is put into a pot heater (not shown) and essentially cooked—i.e., exposed to steam heat and pressure for a period of time and the tread belt 210 becomes cured.

Then, the mold 200 can be removed from the pot heater, and opened. When opening the mold, the inner segments will retract, so that the cured tread belt can be removed. It should be noted that, when retracting (whole sequence in reverse), the follower segments 221 will be the first to retract (i.e., before the leader segments 222). When opening the mold 200, the outer segments 230 will also retract.

Exemplary Dimensions and Parameters

By way of example, the mold 200 is suitable for molding a tread belt for an exemplary two-piece 37R51 tire having the following dimensions and parameters for the mold components (and tire components) are exemplary and approximate, and are intended to convey a sense of proportion (relative scale):

the outer diameter d2 of the tire 100: 100" Dia. (302.51 cm)
the inner diameter d1 of the tire 100: 57 inches (140 cm)
the width W1 of the tread belt 210: 35" (89 cm)
the thickness T of the tread belt 210: 5.6" (14.2 cm)
the diameter D1 of the bottom plate 202: 145-165" (368-419 cm)
the diameter D2 of the top plate 204: 140-145" (356-368 cm)
the height H of the top plate sidewall 204d: 50-65" (127-165 cm)
the number n1 of inner segments 220: 8-14, such as 12
the height W2 of the inner segments 220: 40-50" (102-172 cm)
the number n2 of outer segments 230: 8-14, such as 12
the height W3 of the outer segments 230: 40-50" (102-172 cm)
the number n3 of lugs per outer segment 230: 6
the length L of the driving shaft 242: 50-65" (127-165 cm)
the radial distance R1 between the inner segments 220 and the inner surface of tread belt 210 when the segments are retracted (FIG. 2A): Leader=1.5"-2.0" (4-5 cm); Follower=5"-8" (13-20 cm)

the radial distance R2 between the outer segments 230 and the outer surface of tread belt 210 when the segments are retracted (FIG. 2A): 12-18" (31-48 cm)

the angle $\theta_0$ 25-35 degrees the angle $\theta_1$ 10-20 degrees the angle $\Omega_0$ 5-20 degrees the angle $\Omega_1$ 2-15 degrees the extent S ($S=V_0-V_1$) of the vertical movement of the driving shaft 242: 9-12" (23-30 cm)

The invention has been illustrated and described in a manner that should be considered as exemplary rather than restrictive in character—it being understood that only preferred embodiments have been shown and described, and that all changes and modifications that come within the spirit of the invention are desired to be protected. Undoubtedly, many other "variations" on the techniques set forth hereinabove will occur to one having ordinary skill in the art to which the present invention most nearly pertains, and such variations are intended to be within the scope of the invention, as disclosed herein.

What is claimed is:

1. Mold apparatus for molding a tread belt component of a two-piece tire, comprising:
   a mold constructed of a generally planar, generally circular base plate having an inner surface and an outer surface; and
   a cup-shaped top plate having a generally planar base portion and a generally cylindrical sidewall portion extending downward from a periphery of the base portion, the top plate having an inner surface and an outer surface;
   wherein:
   the mold has a centerline, the base plate is concentric with the centerline, and the top plate is concentric with the centerline; and
   a chamber is formed under the top plate when mold is in a closed position;
   a plurality of inner segments disposed in the mold, each inner segment comprising a generally elongate element comprising a top surface, a bottom surface, an inner surface and an outer surface, and two opposite side edges, the plurality of inner segments including follower segments alternating with leader segments;
   means for controlling radial movement of the inner segments; and
   wherein the means for controlling radial movement of the inner segments comprises:
   a driving shaft having a nominal diameter, a strike plate disposed at a top end of the driving shaft and having a diameter greater than the nominal diameter of the drive shaft;
   a catch plate disposed below the top end of the driving shaft and having a diameter greater than the nominal diameter of the driving shaft;
   a first coil spring disposed about the driving shaft below the catch plate and having a first spring constant;
   a collar disposed about the driving shaft, below the first coil spring having a diameter greater than the nominal diameter of the driving shaft and being free to move axially on the driving shaft;
   a second coil spring disposed about the driving shaft below the collar and having a second spring constant which is greater than the first spring constant;
   a first set of linkage beams extending from between the strike plate and the catch plate of the driving shaft to the follower segments, and forming an angle theta ($\theta$) with respect to horizontal; and
   a second set of linkage beams extending from the collar of the driving shaft to the leader segments and forming an angle omega ($\Omega$) with respect to horizontal.

2. The mold apparatus of claim 1, wherein:
   when the mold is in the closed position the outer surfaces of the inner segments form a substantially continuous, cylindrical surface which is in contact with an inner surface of the tread belt.

3. The mold apparatus of claim 1, wherein:
   the tread belt comprises a cylindrical belt having a width dimension and a thickness dimension; and
   further comprising:
   means for supporting the tread belt within the mold, concentric with the centerline of the mold.

4. The mold apparatus of claim 1, wherein:
   the outer surface of the inner segments is patterned with ridges and grooves which will mold corresponding grooves and ridges into an inner surface of the tread belt.

5. The mold apparatus of claim 1, wherein:
   a first portion of the inner segments are follower segments, a second portion of the inner segments are leader segments;
   the opposite side edges of the follower segments are tapered outwardly with respect to the opposite side edges of the leader segments are tapered inwardly with respect to the radial direction from the centerline.

6. The mold apparatus of claim 1, further comprising:
   a plurality of outer segments disposed in the mold, each outer segment comprising a generally elongate element comprising a top surface, a bottom surface, an inner surface, an outer surface, and two opposite side edges.

7. The mold apparatus of claim 6, wherein:
   when the mold is in its closed position the inner surfaces of the outer segments form a substantially continuous, cylindrical surface in intimate contact with an outer surface of the tread belt.

8. The mold apparatus of claim 6, further comprising:
   means for controlling movement of the outer segments radially inward and outward, with respect to the centerline.

9. The mold apparatus of claim 8, wherein the means for controlling movement of the outer segments comprises:
   a tapered inner surface of the sidewall portion of the top plate; and
   a tapered outer surface of the outer segments.

10. The mold apparatus of claim 6, further comprising:
    T-shaped slots formed in the outer surface of the outer segments, and corresponding features extending from an inner surface of the sidewall portion.

11. The mold apparatus of claim 6, further comprising:
    a number of lugs disposed on the inner surface of selected ones of the outer segments for forming a tread pattern in the tread belt.

* * * * *